US008510354B1

(12) United States Patent
Langhammer (10) Patent No.: US 8,510,354 B1
(45) Date of Patent: Aug. 13, 2013

(54) CALCULATION OF TRIGONOMETRIC FUNCTIONS IN AN INTEGRATED CIRCUIT DEVICE

(75) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 777 days.

(21) Appl. No.: 12/722,683

(22) Filed: Mar. 12, 2010

(51) Int. Cl.
*G06F 7/00* (2006.01)

(52) U.S. Cl.
USPC ............................ 708/200; 708/209; 708/276

(58) Field of Classification Search
None
See application file for complete search history.

(56) References Cited

U.S. PATENT DOCUMENTS

| | | | |
|---|---|---|---|
| 3,473,160 A | 10/1969 | Wahlstrom | |
| 3,896,299 A * | 7/1975 | Rhodes | 708/4 |
| 4,156,927 A | 5/1979 | McElroy et al. | |
| 4,179,746 A | 12/1979 | Tubbs | |
| 4,212,076 A | 7/1980 | Conners | |
| 4,215,406 A | 7/1980 | Gomola et al. | |
| 4,215,407 A | 7/1980 | Gomola et al. | |
| 4,422,155 A | 12/1983 | Amir et al. | |
| 4,484,259 A | 11/1984 | Palmer et al. | |
| 4,521,907 A | 6/1985 | Amir et al. | |
| 4,575,812 A | 3/1986 | Kloker et al. | |
| 4,597,053 A | 6/1986 | Chamberlin | |
| 4,616,330 A | 10/1986 | Betz | |
| 4,623,961 A | 11/1986 | Mackiewicz | |
| 4,682,302 A | 7/1987 | Williams | |
| 4,718,057 A | 1/1988 | Venkitakrishnan et al. | |
| 4,727,508 A | 2/1988 | Williams | |
| 4,736,335 A | 4/1988 | Barkan | |
| 4,791,590 A | 12/1988 | Ku et al. | |
| 4,799,004 A | 1/1989 | Mori | |
| 4,823,295 A | 4/1989 | Mader | |
| 4,839,847 A | 6/1989 | Laprade | |
| 4,871,930 A | 10/1989 | Wong et al. | |
| 4,912,345 A | 3/1990 | Steele et al. | |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

Altera Corporation, "Digital Signal Processing (DSP)," *Stratix Device Handbook*, vol. 2, Chapter 6 and Chapter 7, v1.1 (Sep. 2004).

(Continued)

*Primary Examiner* — Michael D Yaary
(74) *Attorney, Agent, or Firm* — Ropes & Gray LLP; Jeffrey H. Ingerman (57) ABSTRACT

Circuitry for computing on x and y datapaths a trigonometric function of an input on a z datapath includes a comparison element to determine that the input is at or above a threshold, or below the threshold. The circuitry also includes a first left-shifter for shifting the z datapath by a constant when the input is below the threshold, and a second left-shifter for shifting an initialization value of the x datapath when the input is below the threshold. The circuitry further includes a look-up table including inverse tangent values based on negative powers of 2, and based on negative powers of 2-plus-the-constant and shifted by the constant, for adding to/subtracting from the z datapath, shifters for right-shifting elements of the x and y datapaths by amounts incorporating the constant and respective predetermined shift amounts that are adjusted when the input is below the threshold.

40 Claims, 6 Drawing Sheets

(56) References Cited

U.S. PATENT DOCUMENTS

| | | |
|---|---|---|
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,375,079 A | 12/1994 | Uramoto et al. |
| 5,381,357 A | 1/1995 | Wedgwood et al. |
| 5,404,324 A | 4/1995 | Colon-Bonet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |

| | | | |
|---|---|---|---|
| 6,107,824 A | 8/2000 | Reddy et al. |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,385,632 B1* | 5/2002 | Choe et al. ............... 708/270 |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg et al. |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,313,585 B2 | 12/2007 | Winterrowd |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,668,896 B2 | 2/2010 | Lutz et al. |
| 7,719,446 B2 | 5/2010 | Rosenthal et al. |
| 7,769,797 B2 | 8/2010 | Cho et al. |
| 7,930,335 B2 | 4/2011 | Gura |
| 7,930,336 B2 | 4/2011 | Langhammer |
| 2001/0023425 A1 | 9/2001 | Oberman et al. |
| 2001/0029515 A1 | 10/2001 | Mirsky |
| 2001/0037352 A1 | 11/2001 | Hong |
| 2002/0002573 A1 | 1/2002 | Landers et al. |
| 2002/0038324 A1 | 3/2002 | Page et al. |
| 2002/0049798 A1 | 4/2002 | Wang et al. |
| 2002/0078114 A1 | 6/2002 | Wang et al. |
| 2002/0089348 A1 | 7/2002 | Langhammer |
| 2002/0116434 A1 | 8/2002 | Nancekievill |
| 2002/0129073 A1 | 9/2002 | Page et al. |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267857 A1 | 12/2004 | Abel et al. |
| 2004/0267863 A1 | 12/2004 | Bhushan et al. |
| 2005/0038842 A1 | 2/2005 | Stoye |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |
| 2005/0187997 A1 | 8/2005 | Zheng et al. |
| 2005/0187999 A1 | 8/2005 | Zheng et al. |
| 2005/0262175 A1 | 11/2005 | Iino et al. |
| 2006/0020655 A1 | 1/2006 | Lin |
| 2006/0059215 A1* | 3/2006 | Maharatna et al. .......... 708/200 |
| 2007/0083585 A1 | 4/2007 | St. Denis et al. |
| 2007/0124352 A1* | 5/2007 | Wittig ........................ 708/200 |
| 2007/0185951 A1 | 8/2007 | Lee et al. |
| 2007/0185952 A1 | 8/2007 | Langhammer et al. |
| 2007/0241773 A1 | 10/2007 | Hutchings et al. |
| 2008/0133627 A1 | 6/2008 | Langhammer et al. |
| 2008/0183783 A1 | 7/2008 | Tubbs |
| 2009/0172052 A1 | 7/2009 | DeLaquil et al. |
| 2009/0187615 A1 | 7/2009 | Abe et al. |
| 2009/0300088 A1 | 12/2009 | Michaels et al. |
| 2010/0098189 A1 | 4/2010 | Oketani |

FOREIGN PATENT DOCUMENTS

| | | |
|---|---|---|
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95-27243 | 10/1995 |
| WO | WO96-28774 | 9/1996 |
| WO | WO97-08606 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO 2005/066832 | 7/2005 |
| WO | WO2005-101190 | 10/2005 |

OTHER PUBLICATIONS

Altera Corporation, "DSP Blocks in Stratix II and Stratix II GX Devices," *Stratix II Device Handbook*, vol. 2, Chapter 6, v4.0 (Oct. 2005).

Amos, D., "PLD architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfiourable Computing. 10th International Conference, FPL 2000. Proceedings (Lecture Notes in Computer Science* vol. 1896), Aug. 27-30, 2000, pp. 456-461.

Aoki, T., "Signed-weight arithmetic and its application to a field-programmable digital filter architecture," *IEICE Transactions on Electronics* , 1999 , vol. E82C, No. 9, Sep. 1999, pp. 1687-1698.

Ashour, M.A., et al., "An FPGA implementation guide for some different types of serial-parallel multiplier-structures," *Microelectronics Journal* , vol. 31, No. 3, 2000, pp. 161-168.

Berg, B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International.Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL '98. Proceedings*, Hartenstein, R.W., et al., eds., Aug. 31-Sep. 3, 1998, pp. 441-445.

Gaffer, A.A., et al., "Floating-Point Bitwidth Analysis via Automatic Differentiation," *IEEE Conference on Field Programmable Technology*, Hong Kong, Dec. 2002.

Guccione, S.A.,"Run-time Reconfiguration at Xilinx," *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.

Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896) Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *ORCA® FPGA Express™ Interface Manual: ispLEVER® Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings* (IEEE Cat. No. 96TH8140) Oct. 21-24, 1996, pp. 275-279.

Jones, G., "Field-programmable digital signal conditioning," *Electronic Product Design*, vol. 21, No. 6, Jun. 2000, pp. C36-C38.

Kiefer, R., et al., "Performance comparison of software-FPGA hardware partitions for a DSP application " *14th Australian Microelectronics Conference.Microelectronics: Technology Today for the Future. MICRO '97 Proceedings*, Sep. 28-Oct. 1, 1997, pp. 88-93.

Kramberger, I., "DSP acceleration using a reconfigurable FPGA," *ISIE '99 Proceedings of the IEEE International Symposium on Industrial Electronics* (Cat. No. 99TH8465), vol. 3 , Jul. 12-16, 1999, pp. 1522-1525.

Langhammer, M., "How to implement DSP in programmable logic," *Elettronica Oggi*, No. 266 , Dec. 1998, pp. 113-115.

Langhammer, M., "Implementing a DSP in Programmable Logic " *Online EE Times*, May 1998, http:--www.eetimes.com-editorial-1998-coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloquium on Evolvable.Hardware Systems (Digest)*, No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+DSP)," *Proceedings IECON '91. 1991 International Conference on Industrial Electronics, Control and Instrumentation* (Cat. No. 91CH2976-9) vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL '99, Proceedings (Lecture Notes in Computer Science* vol. 1673), Lysaght, P., et al., eds., Aug. 30-Sep. 1, 1999, pp. 264-273.

Tralka, C., "Symbiosis of DSP and PLD," *Elektronik*, vol. 49, No. 14, Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems*, 1998 SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Walters, A.L., "A Scaleable FIR Filter Implementation Using 32-bit Floating-Point Complex Arithmetic on a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., "XtremeDSP Design Considerations User Guide," v 1.2, Feb. 4, 2005.

Altera Corporation, "Advanced Synthesis Cookbook: a Design Guide for Stratix II, Stratix III and Stratix IV Devices," Document Version 3.0, 112 pgs., May 2008.

deDinechin, F. et al., "Large multipliers with less DSP blocks," retrieved from http://hal-ens-lyon.archives-ouvertes.fr/ensl-00356421/en/, 9 pgs., available online Jan. 2009.

Wajih, E.-H.Y. et al., "Efficient Hardware Architecture of Recursive Karatsuba-Ofman Multiplier," *3rd International Conference on Design and Technology of Integrated Systems in Nanoscale Era*, 6 pgs, Mar. 2008.

Zhou, G. et al., "Efficient and High-Throughput Implementations of AES-GCM on FPGAs," *International Conference on Field-Programmable Technology*, 8 pgs., Dec. 2007.

Altera Corporation, "FIR Compiler: MegaCore® Function User Guide," version 3.3.0, rev. 1, pp. 3 11 through 3 15 (Oct. 2005).

Govindu, G. et al., "A Library of Parameterizable Floating-Point Cores for FPGAs and Their Application to Scientific Computing," *Proc Int'l Conf. Eng. Reconfigurable Systems and Algorithms (ERSA '05)*, Jun. 2005.

Govindu, G. et al., "Analysis of High-performance Floating-point Arithmetic on FPGAs," *Proceedings of the 18th International Parallel and Distributed Processing Symposium (PDPS'04)*, pp. 149-156, Apr. 2004.

Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Vladimirova, T. et al., "Floating-Point Mathematical Co-Processor for a Single-Chip On-Board Computer," *MAPLD '03 Conference*, D5, Sep. 2003.

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Haynes, S.D., et al., "Configurable multiplier blocks for embedding in FPGAs," *Electronics Letters*, vol. 34, No. 7, pp. 638-639 (Apr. 2, 1998).

Altera Corporation, "Stratix II Device Handbook, Chapter 6—DSP Blocks in Stratix II Devices," v1.1, Jul. 2004.

Xilinx Inc., "Complex Multiplier v2.0", DS291 Product Specification/Datasheet, Nov. 2004.

* cited by examiner

CALCULATION OF TRIGONOMETRIC FUNCTIONS IN AN INTEGRATED CIRCUIT DEVICE

BACKGROUND OF THE INVENTION

This invention relates to calculating trigonometric functions in integrated circuit devices, and particularly in programmable integrated circuit devices such as programmable logic devices (PLDs).

Trigonometric functions are generally defined for the relatively small angular range of 0-360°, or 0-2π radians. For angular values above 2π, the values of the trigonometric functions repeat. Indeed, one could restrict the range to 0-π/2, because various trigonometric identities can be used to derive values for trigonometric functions of any angle between π/2 and 2π from trigonometric functions of angles between 0 and π/2.

One method may that be used in integrated circuit devices for calculating trigonometric functions is the CORDIC algorithm, which uses the following three recurrence equations:

$$x_{n+1} = x_n - d_n y_n 2^{-n}$$

$$y_{n+1} = y_n + d_n x_n 2^{-n}$$

$$z_{n+1} = z_n - d_n \tan^{-1}(2^{-n})$$

For example, to calculate a sine or cosine of an input, the x value is initialized to "1", the y value is initialized to "0", and the Z value is initialized to the angle required. Z is then rotated towards zero, which determines the sign of $d_n$, which is ±1—if $z_n$ is positive, then so is $d_n$, as the goal is to bring z closer to 0; if $z_n$ is negative, then so is $d_n$, for the same reason. x and y represent the x and y components of a unit vector, as z rotates, so does that vector, and when z has reached its final rotation to 0, the values of x and y will have converged to the cosine and sine, respectively, of the input angle.

To account for stretching of the unit vector during rotation, a scaling factor is applied to the initial value of x. The scaling factor is:

$$\prod_{n=0}^{\infty} \sqrt{1 + 2^{-2n}} = 1.64676025812106564\ldots$$

The initial x is therefore set to 1/1.64677 . . . =0.6072529 35 . . . .

Although CORDIC appears to be easily implemented in integrated circuit devices such as FPGAs, closer analysis shows inefficient use of logic structures. Common FPGA architectures have 4-6 input functions, followed by a dedicated ripple carry adder, followed by a register. When used for calculating floating-point functions, such as the case of single-precision sine or cosine functions, the number of hardware resources required to generate an accurate result for smaller input values can become large.

In one embodiment of a CORDIC implementation, the number of registers will be the datapath precision, multiplied by 3 (the width of the three datapaths x, y and z), multiplied by the datapath precision (the depth of pipeline must be sufficient to include the contributions all of the bits in the input numbers and the arc-tangent constants). In other words, the approximate size of the pipeline is $$R = 3W^2$$

where R is the number of registers and W is the datapath precision.

The amount of logic used is proportional to the square of the precision. For single-precision floating-point arithmetic (e.g., in accordance with the IEEE754-1985 standard for floating-point arithmetic), the 23-bit mantissa precision requires a much larger fixed-point CORDIC datapath. Assuming a full-range input (which may be restricted to approximately π/2 as discussed above), 23 bits are needed for the mantissa, plus one bit for the implied leading "1" and one bit for the sign bit position. Further bits may be required to the right of the mantissa, as each successive stage adds a smaller fraction of the other datapath. For example, if 30-bit datapath precision is accurate enough for a full range input, then 41 bits would likely be needed to cover the entire range of possible inputs. Using the $3W^2$ formula, 2700 registers would be needed for a 30-bit datapath, but 5043 registers—almost twice as many—would be needed for a 41-bit datapath.

In addition, in current FPGA architectures, ripple-carry adders are used as discussed above. Although there are some architectural features in some FPGAs to improve the speed of ripple-carry adders, generally the propagation delay of a ripple-carry adder varies linearly with the precision. In a ripple-carry adder, bit 0 is fixed immediately beside bit 1, which in turn is fixed immediately beside bit 2, and so on—both at the source and the destination. A large number of wide datapaths with a ripple carry adder at each stage would impose a severe routing constraint, reducing system performance because of routing congestion.

For relatively large angles, accuracy will be better for a given wordlength. Smaller angles will be subject to larger errors, for two reasons principally related to the Z datapath. First, the initial rotations applied may be much larger than the angle represented. For example, the first rotation, where n=0, is by $\tan^{-1}(1)$ or 45°. Therefore, a number of iterations will be required just to return the Z datapath to the original input order of magnitude. In addition, for the later, smaller, rotations, they may reduce to zero values before the end of the datapath, affecting accuracy at that end.

SUMMARY OF THE INVENTION

According to embodiments of the present invention, a modified CORDIC implementation treats different ranges of input angles differently. As discussed above, accuracy does not suffer for large angles, so a standard CORDIC implementation may be used. For very small angles (particularly if one restricts inputs to between 0 and π/2 and relies on the aforementioned trigonometric identities for other values), sin(θ) approaches θ as θ approaches 0, so the result can be approximated as sin(θ)=θ. For in-between angles, some number of initial steps of the CORDIC algorithm may be skipped, as discussed in more detail below.

According to embodiments of the invention, "large" angles may be those for which, when expressed as $x \times 2^n$, $n \geq 0$, while small angles are those for which $n \leq -11$, and intermediate angles are therefore those for which $-10 \leq n \leq -1$. Under the aforementioned IEEE754-1985 standard for floating-point arithmetic, where the exponent may assume any value between 0 and 256, exponents are offset, to facilitate computation, by 127, so that a "real" exponent of 0 becomes an exponent of 127, while a real exponent of 128 becomes 255 and a real exponent of −127 becomes 0. Thus, using IEEE754-1985 floating-point arithmetic, large angles may be those for which $n \geq 127$, while small angles are those for which $n \leq 116$, and intermediate angles are therefore those for which $117 \leq n \leq 126$.

As discussed above, for intermediate angles, the initial rotations of a standard CORDIC implementation may exceed the size of the angle itself. Therefore, in accordance with a modified CORDIC implementation according to the invention, the first few rotations may be skipped—i.e., instead of starting with n=0, the CORDIC implementation will start with some higher value of n. However, for every rotation that is skipped, the corresponding term would then be divided out of the aforementioned scaling factor.

In one embodiment of the invention, the number of rotations, or levels of the CORDIC process, that are skipped is always the same. In another embodiment, there may be multiple possible entry points to the CORDIC process. In either embodiment, the input angle may be left-shifted to normalize it to the maximum dynamic range of the available precision of the z datapath. The inverse tangent value is similarly shifted to compensate. No renormalization or denormalization is required at the end of the process because the z value is never actually used in the x or y datapath; z is used only to determine when the process has converged on the result.

In cases where the input angles are restricted to values between 0 and $\pi/2$, then the value of x will always be close to 1, meaning that, except for a leading 0 signifying a positive number, there will be a significant number of consecutive ones before the first zero is encountered. To increase accuracy for small angles with a given datapath precision, saturated values may be used in the datapath. Recurrence equations use deterministic methods to correctly reconstruct the contribution of the number discarded past the saturation point of the previous level In accordance with such an embodiment of the invention, x can be left-shifted past some predetermined number of those ones (e.g., 4 or 5) to preserve more precision in the less significant bits. When adding x into y, which, in the 0-to-$\pi/2$ quadrant, will be small, a corresponding number of leading bits of x can be zeroed to compensate for the left-shift. No similar adjustment will be needed in the y value for addition/subtraction into x because, in the 0-to-$\pi/2$ quadrant, x is close to 1 and y is small.

Known techniques for speeding up CORDIC calculations can be used with embodiments according to the invention. For example, once about halfway through the CORDIC calculation of a sine value, the final value of y can be approximated by multiplying the then-current value of y by the then-current value of z. If this technique is used in conjunction with the embodiments above in which the value of z is shifted, then, notwithstanding that according to the discussion above the shifting of z need not be taken into account in the result, here, because z is used in the calculation of y, the result would have to be right-shifted.

Therefore, in accordance with the present invention there is provided circuitry for computing on x and y datapaths a trigonometric function of an input on a z datapath. The circuitry includes a comparison element to determine that the input is at or above a threshold, or below the threshold. The circuitry also includes a first left-shifter for shifting the z datapath by a constant when the input is below the threshold, and a second left-shifter for shifting an initialization value of the x datapath when the input is below the threshold. The circuitry further includes a look-up table including inverse tangent values based on negative powers of 2, and based on negative powers of 2-plus-the-constant and shifted by the constant, for adding to/subtracting from the z datapath, shifters for right-shifting elements of the x and y datapaths by amounts incorporating the constant and respective predetermined shift amounts that are adjusted when the input is below the threshold.

A corresponding method for computing on x and y datapaths a trigonometric function of an input on a z datapath, a method for configuring an integrated circuit device as such circuitry, and a programmable integrated circuit device so configurable, are also provided. Further, a machine-readable data storage medium encoded with instructions for performing the method of configuring an integrated circuit device is provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

As discussed above, in a standard CORDIC implementation:

$$x_{n+1} = x_n - d_n y_n 2^{-n}$$

$$y_{n+1} = y_n + d_n x_n 2^{-n}$$

$$z_{n+1} = z_n - d_n \tan^{-1}(2^{-n})$$

As can be seen from these equations, at the first level (for n=0):

$$x_1 = x_0 - y_0$$

$$y_1 = y_0 + x_0$$

$$z_1 = z_0 - \tan^{-1}(1)$$

Similarly, at the second level (for n=1):

$$x_2 = x_1 - d_1(y_1/2)$$

$$y_2 = y_1 + d_1(x_1/2)$$

$$z_2 = z_1 - d_1 \tan^{-1}(0.5)$$

It will be understood that this continues for additional n until $z_n$ converges to 0, or as close to 0 as required by a particular implementation.

Figure 1:
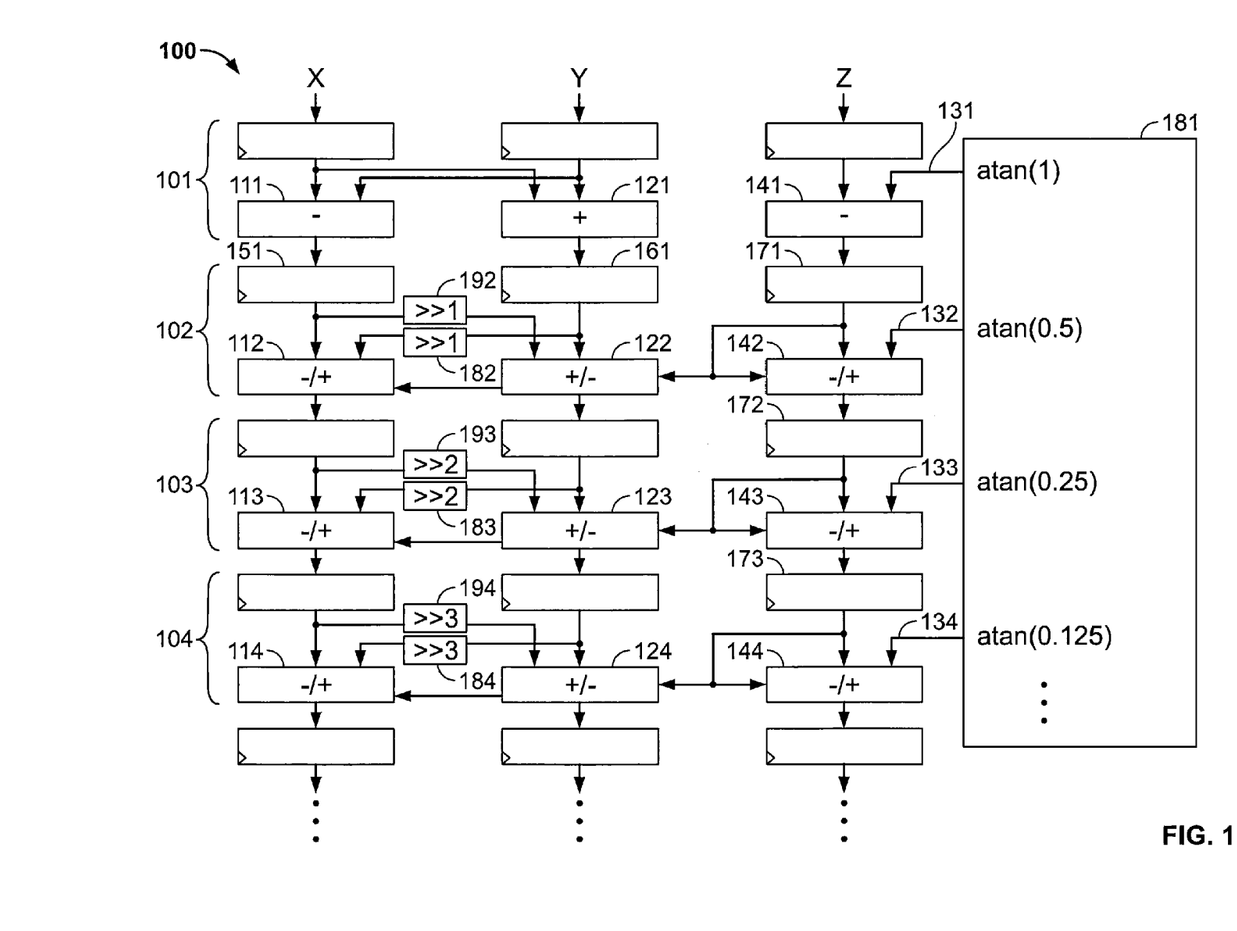
FIG. 1 shows a known CORDIC implementation.

A logical structure 100 for implementing CORDIC is shown in FIG. 1. Structure 100 may be implemented as circuitry. As may be observed, the only operations required (if the inverse tangent values have been precomputed) are additions/subtractions. Although there are division operations, they are all division-by-two, which, in binary digital systems, may be implemented by a simple bit shift. Therefore, only adders (which also may function as subtractors) are needed. In some embodiments, structure 100 may be implemented in a programmable device, such as an FPGA, either in programmable logic, or in a combination of programmable logic and fixed logic (e.g., adders) if provided. For example, FPGAs in the STRATIX® family of FPGAs available from Altera Corporation, of San Jose, Calif., include digital signal processing blocks having multipliers and adders and programmable interconnect for connecting the multipliers and adders. Such an FPGA may be configured to use the adders, as well as any programmable logic that may be needed, to implement structure 100. In addition, the aforementioned STRATIX® FPGAs include embedded memories of various sizes which may useful for storing a table of inverse tangent values, as discussed in more detail below.

As shown in FIG. 1, in first level 101 (n=0), $x_1=x_0-y_0$ is computed at adder/subtractor 111 and stored in register 151. $y_1=y_0+x_0$ is computed at adder/subtractor 121 and stored in register 161. The inverse tangent (represented as "atan") of 1 is read in at 131 from table 181 and subtracted at adder/subtractor 141 from $z_0$ to yield $z_1$ and stored in register 171. As noted above, the inverse tangent values may be precomputed and stored as a table in a suitable memory such as one of the foregoing memories in the aforementioned STRATIX® FPGA devices. The only inverse tangent values that are necessary are those of negative powers of two (as well as that of 2°). The depth of the table (i.e., the number entries required) is the number likely to be sufficient to reach convergence, which would be close to the bit width of the datapath.

In second level 102 (n=1), $x_2=x_1-d_1(y_1/2)$, where $d_1$ is the sign of the value in register 171 and $y_1$ is divided by two by 1-bit shifter 182, is computed at adder/subtractor 112 and $y_2=y_1+d_1(x_1/2)$, where $x_1$ is divided by two by 1-bit shifter 192, is computed at adder/subtractor 122. The inverse tangent of 0.5 is read in at 132 from table 181 and subtracted at adder/subtractor 142 from $z_1$ to yield $z_2$.

In third level 103 (n=2), $x_3=x_2-d_2(y_2/4)$, where $d_2$ is the sign of the value in register 172 and $y_2$ is divided by four by 2-bit shifter 183, is computed at adder/subtractor 113 and $y_3=y_2+d_2(x_2/4)$, where $x_2$ is divided by four by 2-bit shifter 193, is computed at adder/subtractor 123. The inverse tangent of 0.25 is read in at 133 from table 181 and subtracted at adder/subtractor 143 from $z_2$ to yield $z_3$.

In fourth level 104 (n=3), $x_4=x_3-d_3(y_3/8)$, where $d_3$ is the sign of the value in register 173 and $y_3$ is divided by eight by 3-bit shifter 184, is computed at adder/subtractor 114 and $y_4=y_3+d_3(x_3/8)$, where $x_3$ is divided by eight by 3-bit shifter 194, is computed at adder/subtractor 124. The inverse tangent of 0.125 is read in at 134 from table 181 and subtracted at adder/subtractor 144 from $z_3$ to yield $z_4$.

Additional levels may be provided up to about the bit width of the datapath, as discussed above.

Figure 2:
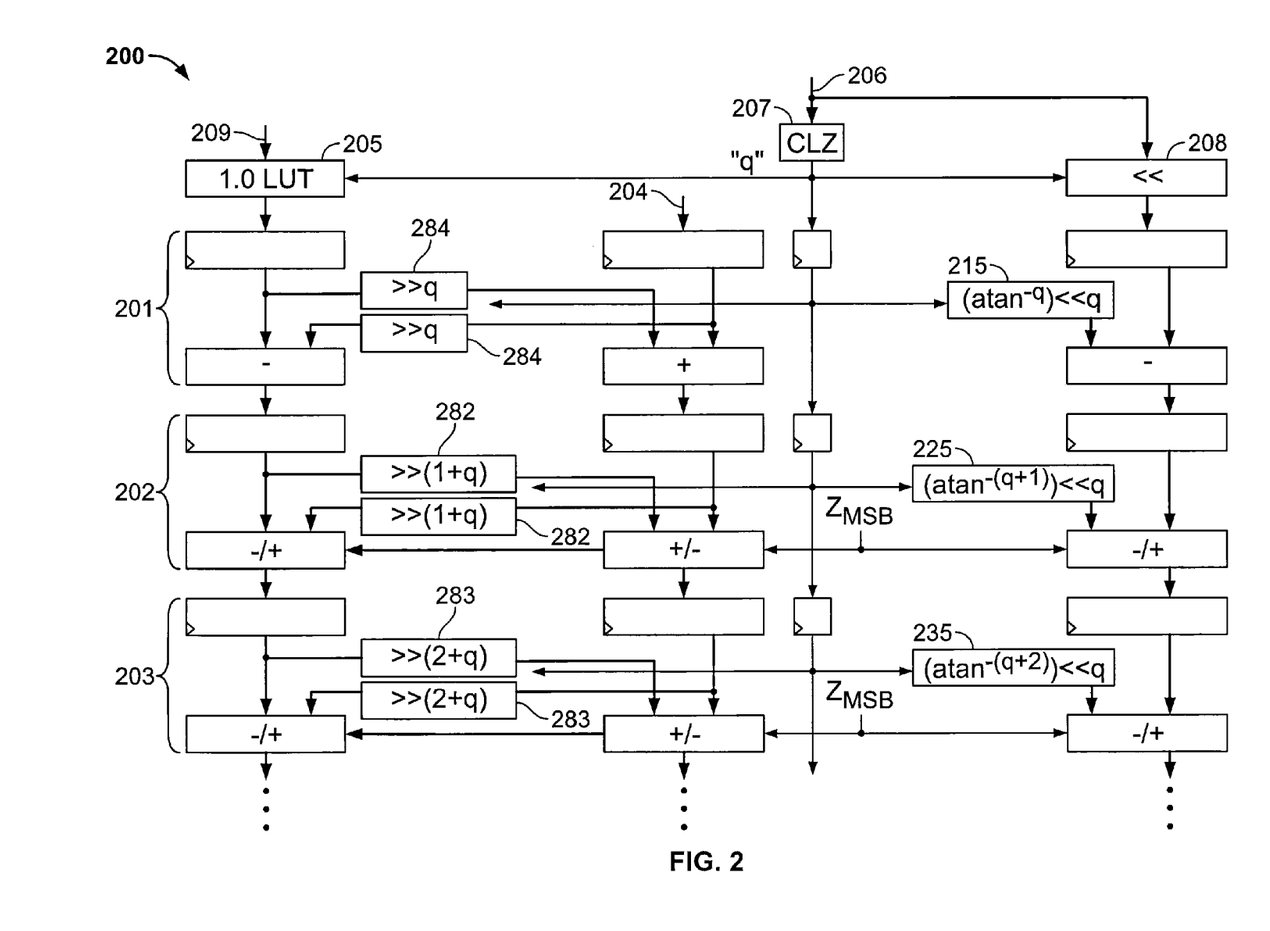
FIG. 2 shows another embodiment of a CORDIC implementation.

A logical structure 200 for implementing a first embodiment is shown in FIG. 2. y is input at 204. z is input at 206 and the number of leading zeroes q in z is determined by count-leading-zeroes module 207. z is then left-shifted by q by left-shifter 208 so that it can take advantage of the entire width of the z datapath. At each level n, there is a respective look-up table 215, 225, 235 that selects between the inverse tangent of $2^{-n}$ and the inverse tangent of $2^{-(n+q)}$ left-shifted by q (because z has been left-shifted as just described), depending on whether traditional CORDIC (as in FIG. 1, for, e.g., a larger input value) or the first embodiment of according to the present invention (for, e.g., a smaller input value) is being used. Alternatively, one large look-up table (not shown), similar to look-up table 181 of FIG. 1, can be provided. Either way, the look-up tables must have, for each value of n, inverse tangent values for each possible value of q, left-shifted by q. "q" can have any value up to the precision of the datapath. The larger the range of "q", the bigger the table, as there will be "q" shifted copies of each value.

As discussed above, if this first embodiment is being used, the scaling factor that has been applied to x has to be adjusted to account for the q levels that are being skipped. q terms must be divided out of the infinite series set forth above, meaning that scaling factor, which is the inverse of the infinite series, must be multiplied by q terms. Thus, if q=1, the corrected scaling factor is $0.607252935 \ldots \times (1+2^{-2\times 0})^{0.5}= 0.8587853 \ldots$; if q=2, the corrected scaling factor is $0.607252935 \ldots \times (1+2^{-2\times 0})^{0.5} \times (1+2^{-2\times 1})^{0.5}= 0.96015119 \ldots$; if q=3, the corrected scaling factor is $0.607252935 \ldots \times (1+2^{-2\times 0})^{0.5} \times (1+2^{-2\times 1})^{0.5} \times (1+2^{-2\times 2})^{0.5}=0.989701198\ldots$, and so on. The correct scaling factor, based on the value of q, may be stored in look-up table 205 and used to adjust the input value 209 of x.

Levels 201, 202, 203 of FIG. 2 are otherwise similar to levels 101, 102, 103 of FIG. 1, except that shifters 282, 283 shift by q+1 and q+2, respectively, rather than by 1 and 2, respectively, and level 201 has shifters 284 that shift by q where level 101 has no corresponding shifter. Further levels (not shown) operate similarly.

Figure 3:
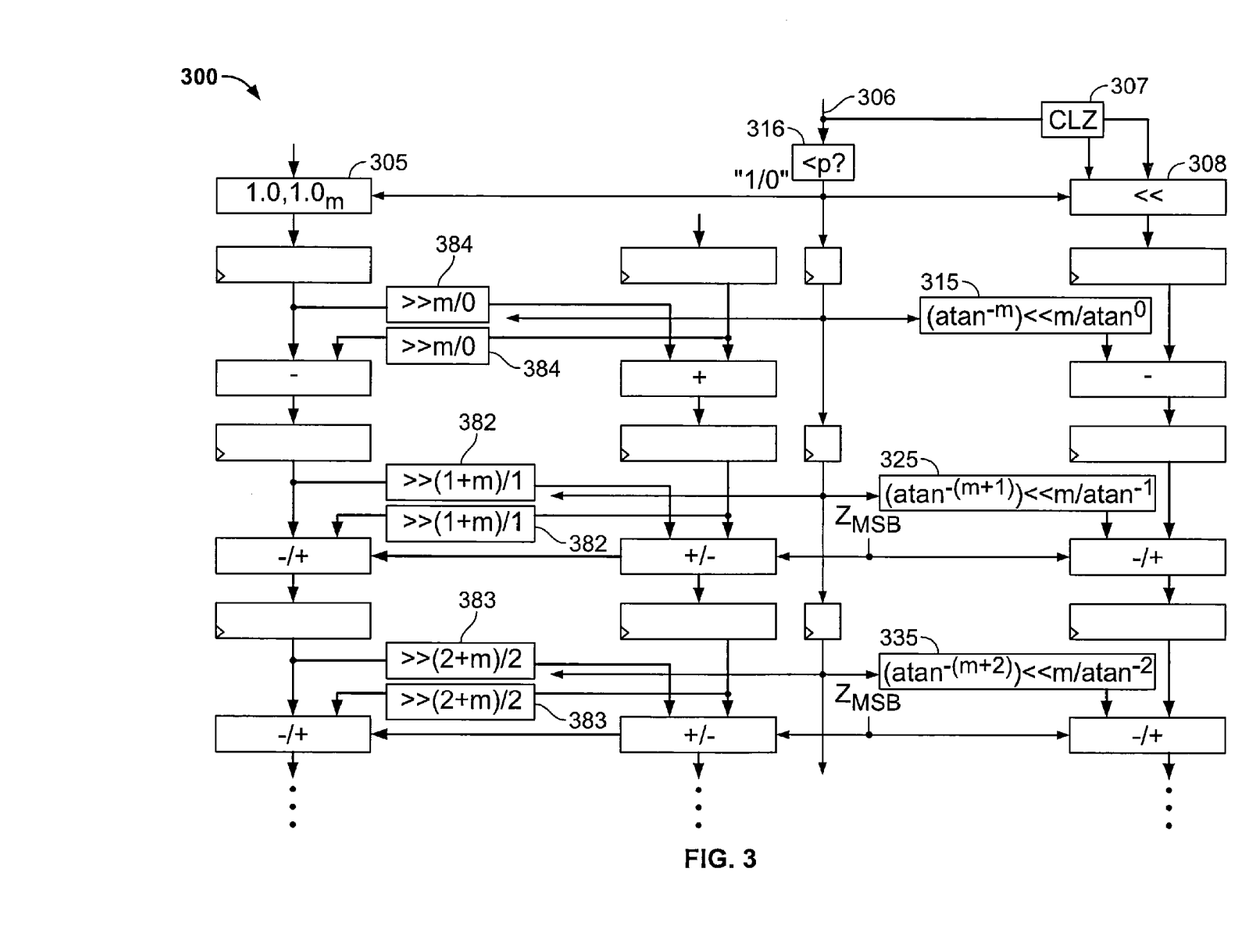
FIG. 3 shows yet another embodiment of a CORDIC implementation.

The embodiment of FIG. 2 allows multiple entry points to the CORDIC implementation, based on the different values of q. A simplified embodiment 300 shown in FIG. 3 provides only one alternative entry point. The z input 306 is compared at comparator 316 to a constant. For example, this can be accomplished by simply looking for a minimum of p leading zeroes or ones. If z input 306 is larger than the constant, embodiment 300 works like embodiment 100 of FIG. 1 If z input 306 is less or equal to than the constant, then a fixed number m of levels of the CORDIC calculation are skipped.

Look-up table 305 includes two entries for the scaling factor, selected by the output of comparator 316. One entry is the unaltered scaling factor represented by the infinite series above. The other entry is the same scaling factor with the first m terms divided out of the infinite series (which, because the scaling factor is the inverse of the infinite series, is the uncorrected scaling factor multiplied by the first m terms of the infinite series).

Similarly, each of the look-up tables 315, 325, 335 (and further look-up tables (not shown) in the z datapath) includes two inverse tangent values. One value is the inverse tangent associated with the level to which the look-up table belongs (the same value as in the corresponding level of FIG. 1). The other value is the inverse tangent of $2^{-(level+m)}$, which is further left-shifted by m places because the z value itself is left-shifted by shifter 308 based on the output of count-leading-zeroes module 307. Shifters 382, 383, 384 shift by either 1, 2, and 0, respectively, or by m+1, m+2 and m, respectively. Further levels (not shown) operate similarly.

Figure 4:
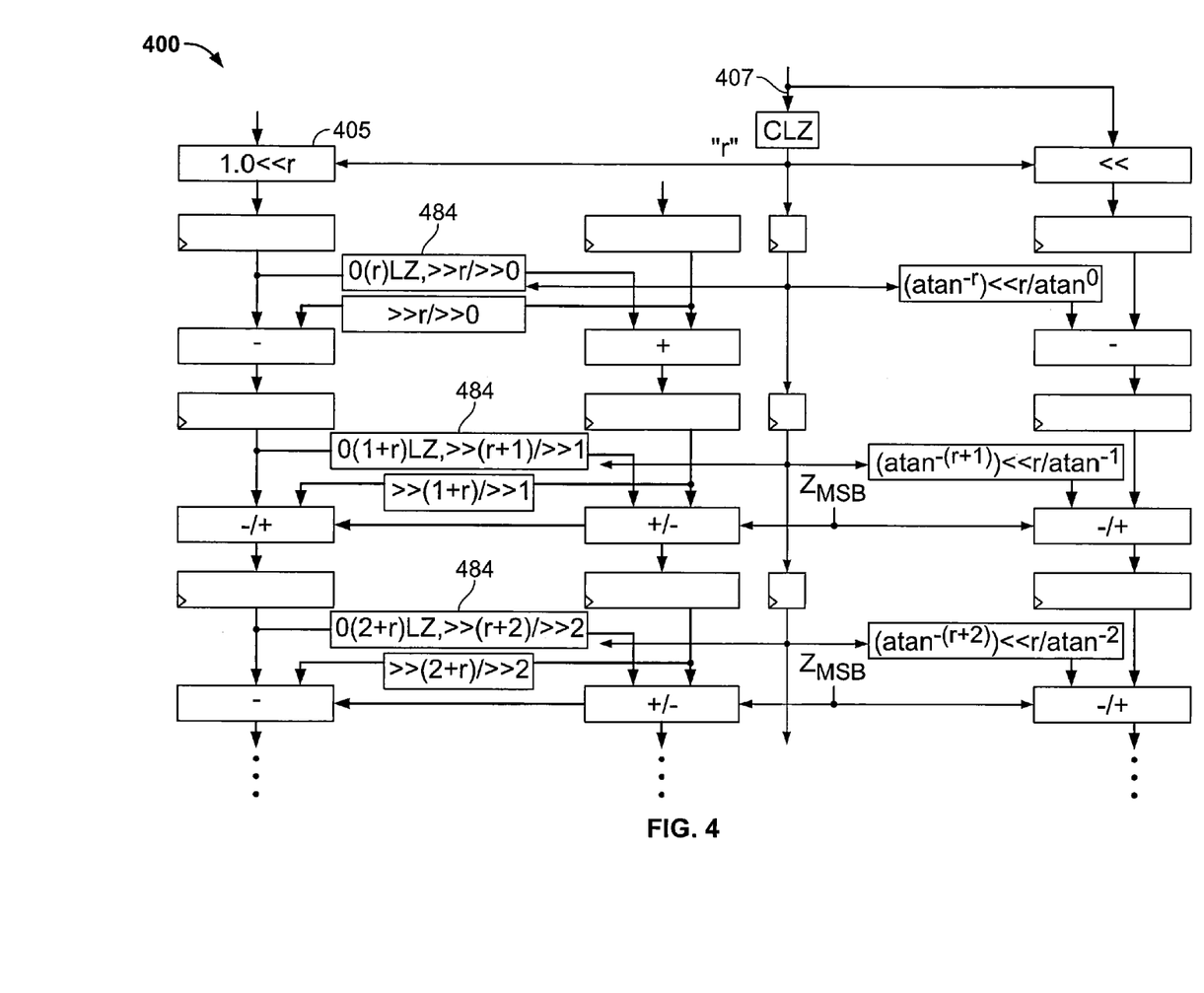
FIG. 4 shows an embodiment of a CORDIC implementation according to the present invention.

According to another embodiment 400 shown in FIG. 4, the magnitude of the z input is checked at count-leading-zeroes module 407, and the z datapath is shifted by the number of leading zeroes r. This can be done for either multiple entry points as in embodiment 200, or for a single entry point as in embodiment 300. The x and y datapaths are handled based on the realization that, given the assumptions (z has a real exponent between −1 and −10 and is limited to the first quadrant), x will start close to 1.0 and will reduce only slightly, while y will start at 0 and become a small positive number.

The corrected x input in look-up table 405 is left-shifted by the shift value r of z (in some embodiments, the shifting amount may be different from r but derived from r). As the x input in look up table 405 is a positive number very close to 1, the left shift operation will saturate the number, i.e. the leading bits will be "1111 . . . ".

As an example, in one embodiment the maximum value that can be represented as a vector might be 1.9999 . . . , in order that any small overflows near 1 will not generate a negative number. The number $1.9999\ldots_{10}$ in a signed number system can be represented by the leading bits "$011111\ldots_2$". Similarly, the number $1.0_{10}$ is therefore "$010000\ldots_2$". A number slightly less than $1.0_{10}$ will be "$001111\ldots_2$". From this one knows that the bits shifted into the integer range (and therefore discarded) start with at least two zeroes and a run of ones, where the number of ones equals the shift amount less the number of zeroes (which may be 2).

Using this representation, the value from the x datapath to be added to or subtracted from the y datapath is the fractional number shown in the x datapath, right-shifted by the level, and preceded by a computed number of zeroes and a run of ones of a length such that that length plus the computed number equals level. In an embodiment of this representation, a vector can be defined from two concatenated values as shown at 484 in FIG. 4. The less-significant of the two concatenated values is the value of the x datapath at the current level. The more-significant of the two concatenated values is different depending on whether one is in the single-entry-point case or the multiple-entry-point case. In the single-entry point case, the more-significant value is level zeroes, because the value of the x datapath is simply right-shifted by level places. In the multiple-entry-point case, the more-significant value is of length r, and includes (level+r) leading zeroes followed by a run of ones. The shift amount of the vector is (level+r). Although the result of concatenation is that the vector includes the discarded portion of x, and is therefore wider than the precision of the x datapath, during synthesis the least significant values of the vector will be discarded to the right and the amount of logic required for the x datapath will not increase.

As y will always be a small positive number, y can be directly added to or subtracted from the x datapath after being shifted by (level+r) or level as appropriate. The first value of y is 0. The first non-zero value of y will be generated by a shifted value of x, and therefore x and y will have the correct magnitudes relative to each other. The y value will have to be shifted by the same amount as the x value at each level, but as the leading bits in the y register will always be 0, and therefore of the same sign as the x value, no treatment of the leading bits of the shifted y value is required.

The foregoing discussion assumes that input values are limited to the 0-to-π/2 quadrant. If input values are not limited, the initial values can be negative, in which case the most significant bits of the x input will be ones and when the value is saturated there will be a large number of leading zeroes. In this case, a count-leading-ones module may be used on the z input instead of a count-leading-zeroes module, to derive a value to shift away most of the leading zeroes in the x input.

Use of embodiment 400 maximizes use of the datapath widths by allowing more significant bits of z to be used by eliminating the leading zeroes, and by allowing more significant bits of x to be used by eliminating leading ones (remembering that x is close to 1.0 so that its binary representation will start with many ones) so that any zeroes in the less significant bits have a chance to contribute.

Instructions for carrying out a method according to this invention for programming a programmable device to derive range-reduced angular values may be encoded on a machine-readable medium, to be executed by a suitable computer or similar device to implement the method of the invention for programming or configuring PLDs or other programmable devices to perform addition and subtraction operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 5:
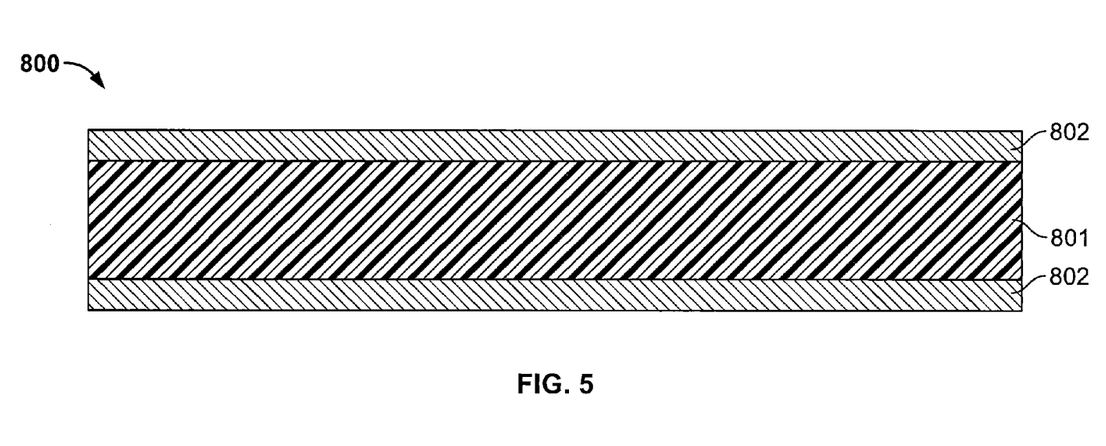
FIG. 5 is a cross-sectional view of a magnetic data storage medium encoded with a set of machine-executable instructions for performing the method according to the present invention.

FIG. 5 presents a cross section of a magnetic data storage medium 800 which can be encoded with a machine executable program that can be carried out by systems such as the aforementioned personal computer, or other computer or similar device. Medium 800 can be a floppy diskette or hard disk, or magnetic tape, having a suitable substrate 801, which may be conventional, and a suitable coating 802, which may be conventional, on one or both sides, containing magnetic domains (not visible) whose polarity or orientation can be altered magnetically. Except in the case where it is magnetic tape, medium 800 may also have an opening (not shown) for receiving the spindle of a disk drive or other data storage device.

The magnetic domains of coating 802 of medium 800 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 6:
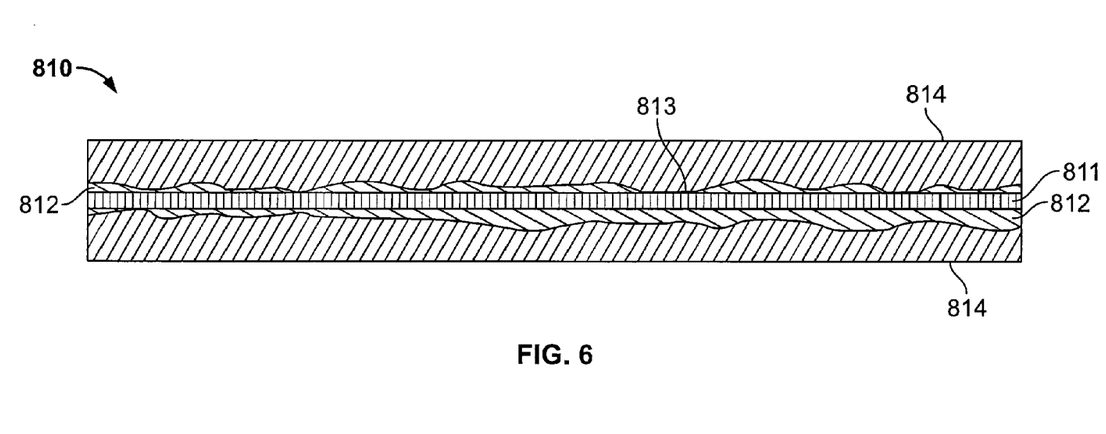
FIG. 6 is a cross-sectional view of an optically readable data storage medium encoded with a set of machine executable instructions for performing the method according to the present invention.

FIG. 6 shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

A PLD 90 programmed according to the present invention may be used in many kinds of electronic devices. One possible use is in a data processing system 900 shown in FIG. 7. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

Figure 7:
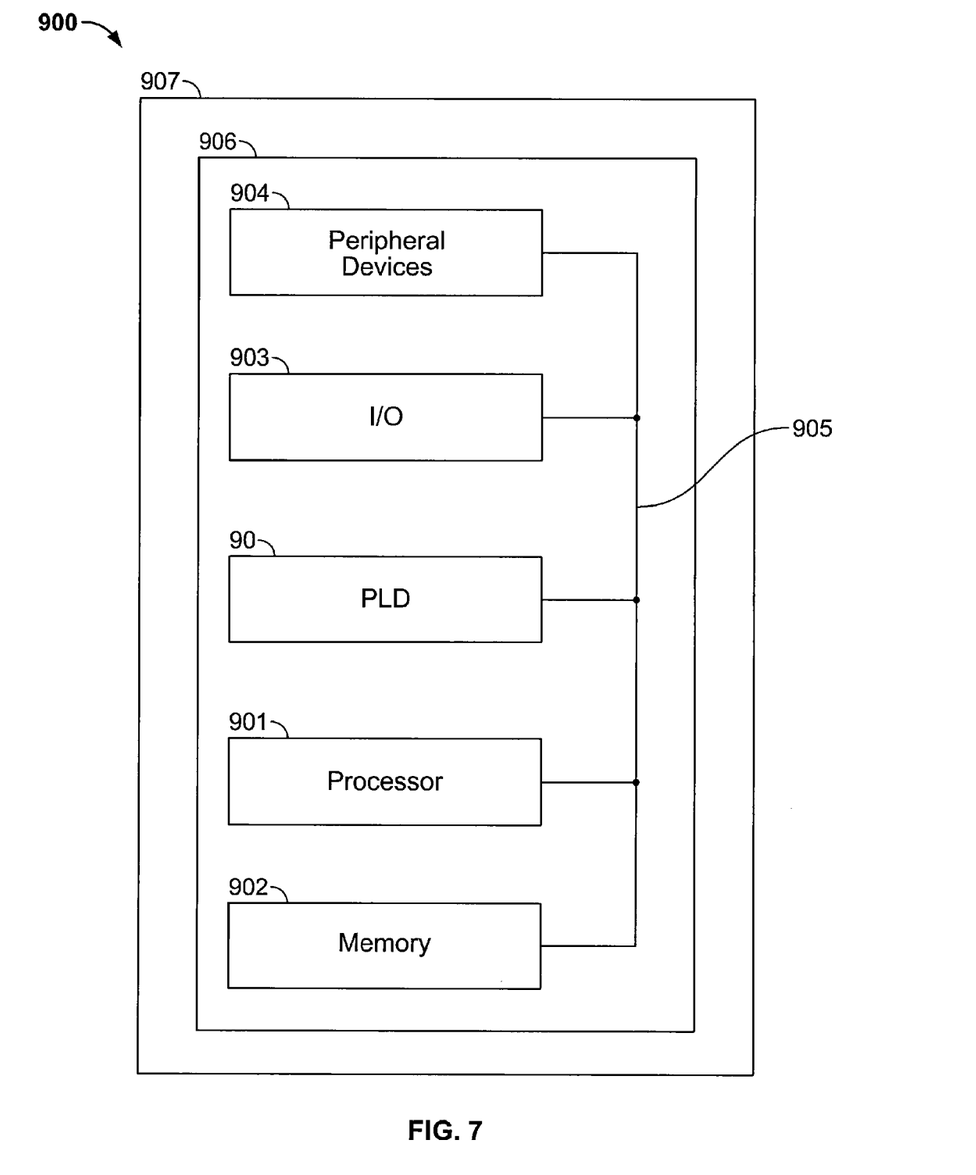
FIG. 7 is a simplified block diagram of an illustrative system employing a programmable logic device incorporating the present invention.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Circuitry for computing on x and y datapaths a trigonometric function of an input on a z datapath, said circuitry comprising:
   a comparison element to determine that said input is at or above a threshold, or below said threshold;
   a first left-shifter for shifting said z datapath by a constant when said input is below said threshold;
   a second left-shifter for shifting an initialization value of said x datapath when said input is below said threshold;
   a look-up table including inverse tangent values based on negative powers of 2, and based on negative powers of 2-plus-said-constant and shifted by said constant, for adding to/subtracting from said z datapath; and
   shifters for right-shifting elements of said x and y datapaths by amounts incorporating said constant and respective predetermined shift amounts that are adjusted when said input is below said threshold.

2. The circuitry of claim 1 wherein said computing implements CORDIC.

3. The circuitry of claim 1 wherein said constant is 0 when said input is at or above said threshold and is a predetermined value when said input is below said threshold.

4. The circuitry of claim 1 wherein:
   said comparison element is a count-leading-zeroes module; and
   said constant is 0 when said input is at or above said threshold and is a value based on a leading-zeroes count from said count-leading-zeroes module when said input is below said threshold.

5. The circuitry of claim 4 wherein said second left-shifter left-shifts said input of said x datapath by said constant.

6. The circuitry of claim 1 wherein:
   said comparison element is a count-leading-ones module; and
   said constant is 0 when said input is at or above said threshold and is a value based on a leading-ones count from said count-leading-ones module when said input is below said threshold.

7. The circuitry of claim 6 wherein said second left-shifter left-shifts said input of said x datapath by said constant.

8. The circuitry of claim 1 wherein said x datapath is scaled by an infinite series and said series is adjusted by a number of series terms where said number is based on said constant.

9. The circuitry of claim 1 wherein when said input is below said threshold, at least one of said predetermined shift amounts is adjusted by a predetermined value.

10. The circuitry of claim 1 wherein, when said input is below said threshold:
    said initialization value of said x datapath is saturated; and
    contribution of most significant bits of said x datapath to said y datapath is reconstructed prior to said shifters for right-shifting.

11. The circuitry of claim 10 wherein when said input is below said threshold, at least one of said predetermined shift amounts is adjusted based on a leading-zeroes count of said input.

12. The circuitry of claim 11 wherein, prior to being shifted by said predetermined shift amount adjusted based on said leading-zeroes count of said input, a number of most significant bits of elements of said x datapath are zeroed, said number of most significant bits being based on said leading-zeroes count of said input.

13. The circuitry of claim 12 wherein an entry value of said x datapath is left-shifted based on said leading zeroes count of said input.

14. The circuitry of claim 10 wherein when said input is below said threshold, at least one of said predetermined shift amounts is adjusted based on a leading-ones count of said input.

15. The circuitry of claim 14 wherein, prior to being shifted by said predetermined shift amount adjusted based on said leading-ones count of said input, a number of most significant bits of elements of said x datapath are changed to ones, said number of most significant bits being based on said leading-ones count of said input.

16. The circuitry of claim 14 wherein an entry value of said x datapath is left-shifted based on said leading ones count of said input.

17. A method of configuring a programmable integrated circuit device as circuitry for computing on x and y datapaths a trigonometric function of an input on a z datapath, said method comprising:
    configuring logic of said programmable integrated circuit device as a comparison element to determine that said input is at or above a threshold, or below said threshold;
    configuring logic of said programmable integrated circuit device as a first left-shifter for shifting said z datapath by a constant when said input is below said threshold;
    configuring logic of said programmable integrated circuit device as a second left-shifter for shifting an initialization value of said x datapath when said input is below said threshold;
    configuring memory of said programmable integrated circuit device as a look-up table including inverse tangent values based on negative powers of 2, and based on negative powers of 2-plus-said-constant and shifted by said constant, for adding to/subtracting from said z datapath; and
    configuring logic of said programmable integrated circuit device as shifters for right-shifting elements of said x and y datapaths by amounts incorporating said constant and respective predetermined shift amounts that are adjusted when said input is below said threshold.

18. The method of claim 17 wherein said programmable integrated circuit device is configured to implement CORDIC.

19. The method of claim 17 wherein said constant is 0 when said input is at or above said threshold and is a predetermined value when said input is below said threshold.

20. The method of claim 17 wherein:
said configuring logic of said programmable integrated circuit device as a comparison element comprises configuring logic of said programmable integrated circuit device as a count-leading-zeroes module; and
said constant is 0 when said input is at or above said threshold and is a value based on a leading-zeroes count from said count-leading-zeroes module when said input is below said threshold.

21. The method of claim 20 wherein said configuring logic of said programmable integrated circuit device as a second left-shifter comprises configuring said logic to left-shift said input of said x datapath by said constant.

22. The method of claim 17 wherein:
said configuring logic of said programmable integrated circuit device as comparison element comprises configuring logic of said programmable integrated circuit device as a count-leading-ones module; and
said constant is 0 when said input is at or above said threshold and is a value based on a leading-ones count from said count-leading-ones module when said input is below said threshold.

23. The method of claim 22 wherein said configuring logic of said programmable integrated circuit device as a second left-shifter comprises configuring logic of said programmable integrated circuit device to left-shift said input of said x datapath by said constant.

24. The method of claim 17 comprising configuring logic of said programmable integrated circuit device to scale said x datapath by an infinite series and to adjust said series by a number of series terms where said number is based on said constant.

25. The method of claim 17 comprising configuring logic of said programmable integrated circuit device so that when said input is below said threshold, at least one of said predetermined shift amounts is adjusted by a predetermined value.

26. The method of claim 17 comprising configuring logic of said programmable integrated circuit device so that, when said input is below said threshold:
said initialization value of said x datapath is saturated; and
contribution of most significant bits of said x datapath to said y datapath is reconstructed prior to said shifters for right-shifting.

27. The method of claim 26 comprising configuring logic of said programmable integrated circuit device so that when said input is below said threshold, at least one of said predetermined shift amounts is adjusted based on a leading-zeroes count of said input.

28. The method of claim 27 comprising configuring logic of said programmable integrated circuit device so that, prior to being shifted by said predetermined shift amount adjusted based on said leading-zeroes count of said input, a number of most significant bits of elements of said x datapath are zeroed, said number of most significant bits being based on said leading-zeroes count of said input.

29. The method of claim 28 comprising configuring logic of said programmable integrated circuit device to left-shift an entry value of said x datapath based on said leading zeroes count of said input.

30. The method of claim 26 comprising configuring logic of said programmable integrated circuit device so that when said input is below said threshold, at least one of said predetermined shift amounts is adjusted based on a leading-ones count of said input.

31. The method of claim 30 comprising configuring logic of said programmable integrated circuit device so that, prior to being shifted by said predetermined shift amount adjusted based on said leading-ones count of said input, a number of most significant bits of elements of said x datapath are changed to ones, said number of most significant bits being based on said leading-ones count of said input.

32. The method of claim 30 comprising configuring logic of said programmable integrated circuit device so that an entry value of said x datapath is left-shifted based on said leading ones count of said input.

33. A non-transitory machine-readable data storage medium encoded with machine-executable instructions for configuring a programmable integrated circuit device as circuitry for computing on x and y datapaths a trigonometric function of an input on a z datapath, said instructions comprising:
instructions to configure logic of said programmable integrated circuit device as a comparison element to determine that said input is at or above a threshold, or below said threshold;
instructions to configure logic of said programmable integrated circuit device as a first left-shifter for shifting said z datapath by a constant when said input is below said threshold;
instructions to configure logic of said programmable integrated circuit device as a second left-shifter for shifting an initialization value of said x datapath when said input is below said threshold;
instructions to configure memory of said programmable integrated circuit device as a look-up table including inverse tangent values based on negative powers of 2, and based on negative powers of 2-plus-said-constant and shifted by said constant, for adding to/subtracting from said z datapath; and
instructions to configure logic of said programmable integrated circuit device as shifters for right-shifting elements of said x and y datapaths by amounts incorporating said constant and respective predetermined shift amounts that are adjusted when said input is below said threshold.

34. The non-transitory machine-readable data storage medium of claim 33 comprising instructions to configure logic of said programmable integrated circuit device so that, when said input is below said threshold:
said initialization value of said x datapath is saturated; and
contribution of most significant bits of said x datapath to said y datapath is reconstructed prior to said shifters for right-shifting.

35. The non-transitory machine-readable data storage medium of claim 34 comprising instructions to configure logic of said programmable integrated circuit device so that when said input is below said threshold, at least one of said predetermined shift amounts is adjusted based on a leading-zeroes count of said input.

36. The non-transitory machine-readable data storage medium of claim 35 comprising instructions to configure logic of said programmable integrated circuit device so that, prior to being shifted by said predetermined shift amount adjusted based on said leading-zeroes count of said input, a number of most significant bits of elements of said x datapath are zeroed, said number of most significant bits being based on said leading-zeroes count of said input.

37. The non-transitory machine-readable data storage medium of claim 36 comprising instructions to configure logic of said programmable integrated circuit device to left-shift an entry value of said x datapath based on said leading zeroes count of said input.

38. The non-transitory machine-readable data storage medium of claim 34 comprising instructions to configure logic of said programmable integrated circuit device so that when said input is below said threshold, at least one of said predetermined shift amounts is adjusted based on a leading-ones count of said input.

39. The non-transitory machine-readable data storage medium of claim 38 comprising instructions to configure logic of said programmable integrated circuit device so that, prior to being shifted by said predetermined shift amount adjusted based on said leading-ones count of said input, a number of most significant bits of elements of said x datapath are changed to ones, said number of most significant bits being based on said leading-ones count of said input.

40. The non-transitory machine-readable data storage medium of claim 38 comprising instructions to configure logic of said programmable integrated circuit device so that an entry value of said x datapath is left-shifted based on said leading ones count of said input.

\* \* \* \* \*